(No Model.) 2 Sheets—Sheet 1.
W. WARREN.
PROCESS OF MANUFACTURING WHOLE WHEAT FLOUR.
No. 254,742. Patented Mar. 7, 1882.
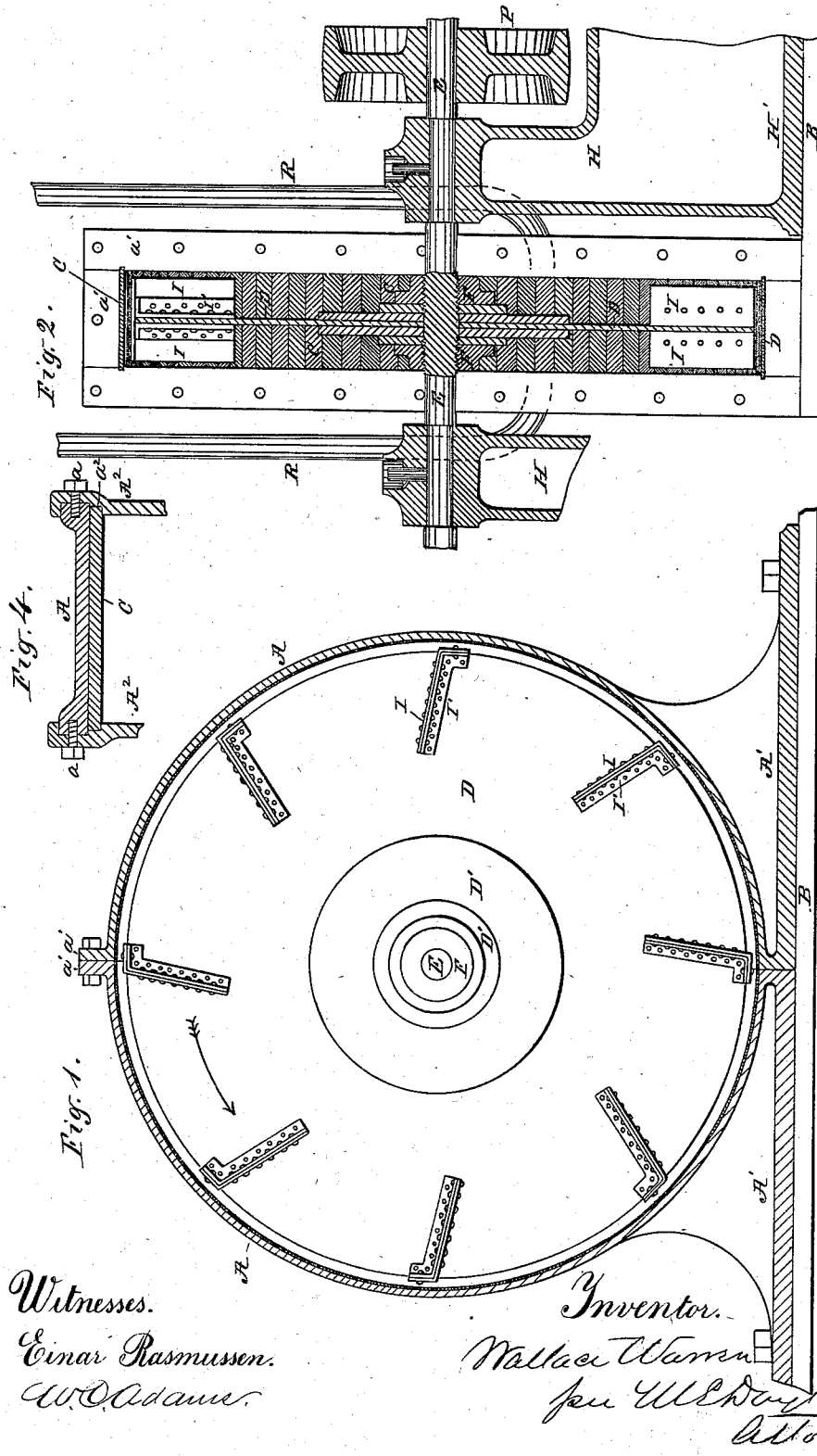
Witnesses.
Einar Rasmussen.
W. C. Adams.
Inventor.
Wallace Warren
per W. C. Dayton
Attorney.

(No Model.) 2 Sheets—Sheet 2.
W. WARREN.
PROCESS OF MANUFACTURING WHOLE WHEAT FLOUR.
No. 254,742. Patented Mar. 7, 1882.
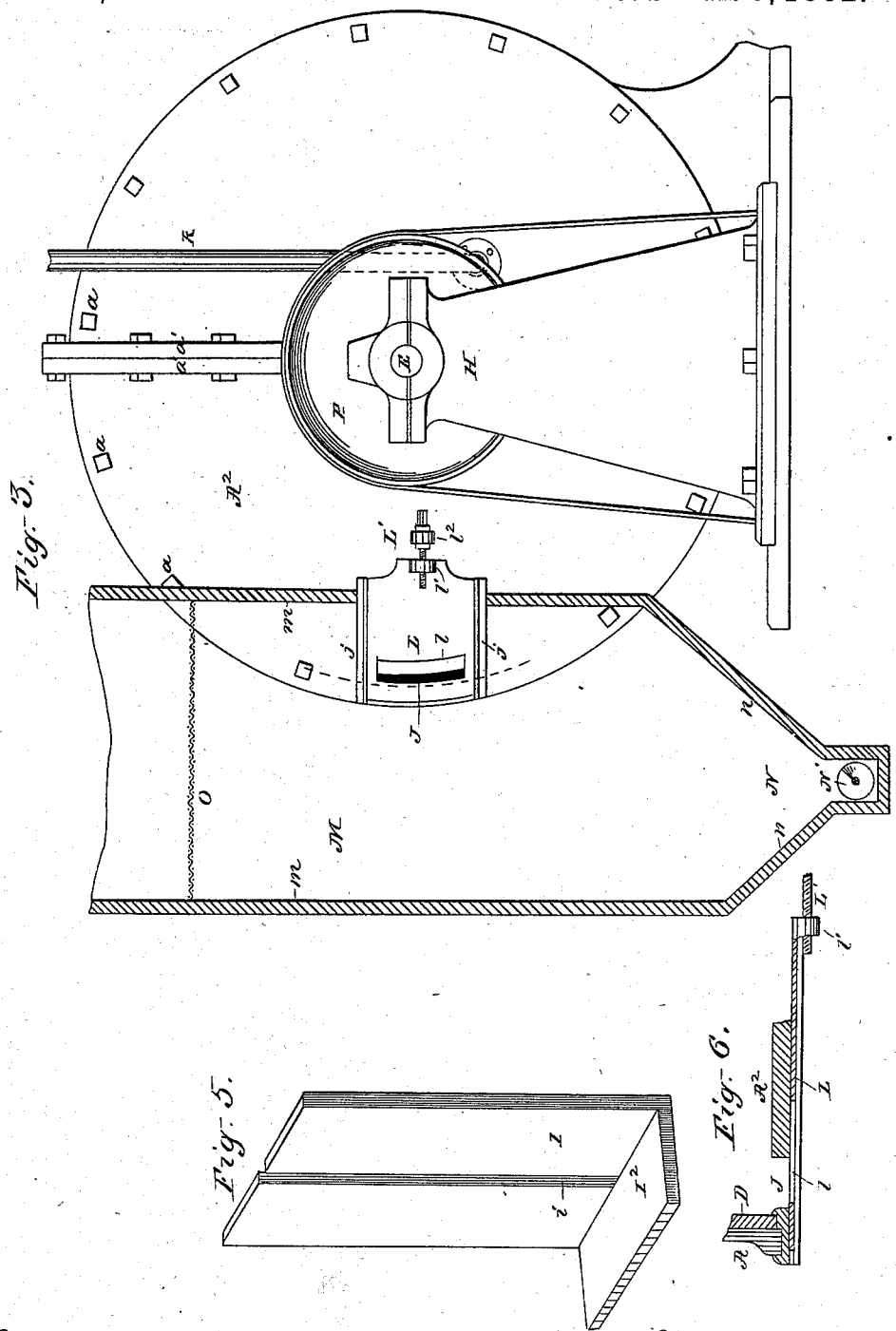
Witnesses.
Einar Rasmussen
W. O. Adams.
Inventor.
Wallace Warren
per M. E. Dayton
Attorney.

UNITED STATES PATENT OFFICE.

WALLACE WARREN, OF CHICAGO, ILLINOIS, ASSIGNOR OF ONE-HALF TO FRANK C. TAYLOR, OF SAME PLACE.

PROCESS OF MANUFACTURING WHOLE-WHEAT FLOUR.

SPECIFICATION forming part of Letters Patent No. 254,742, dated March 7, 1882.

Application filed June 20, 1881. (No model.)

*To all whom it may concern:*

Be it known that I, WALLACE WARREN, of Chicago, State of Illinois, have invented a certain new and useful Process of Manufacturing Whole-Wheat Flour; and I do hereby declare that the following is a full, clear, and exact description thereof.

While the theory of combining in flour or bread a portion of the integument with the inner grain substance, as proposed by Graham, appears to be correct from a hygienic point of view, many imperfections are found to exist in so-called "Graham" flour as heretofore made. Usually such flour has contained the bran in the form of flakes, which bear no comparison in fineness with the remainder of the product. These coarse fragments of bran, being sharp-edged, irritate the coatings of the alimentary passages and produce a variety of disorders. The elements of this form of the flour, moreover, by reason of the coarseness of the bran, fail of that intimate union necessary to produce a homogeneous bread capable of prompt and uniform digestion and perfect assimilation.

Besides the defect just mentioned as being usually present and as being the result of uneven reduction of the components, other defects are present in the old products as a result of inferior modes of manufacture. Thus it has been the universal practice in the production of such flour to pursue the most ancient mode of reducing grain—that is, by grinding the whole grain together until the inner substance is floured. In this operation, by reason of the greater hardness of the integument and the consequent necessity of severe grinding, the glutinous portions of the berry, which are at once the most sensitive to injury from severe grinding, and the most necessary in their unimpaired vitality to the hygienic results sought in whole-wheat flour, have been overheated and killed, greatly to the detriment of the product. I have sought to remedy these defects in the method in the light of modern improvements in the art of milling, which I believe I am the first to have applied to the production of whole-wheat flour. For the better accomplishment of this end I have also devised improvements in machinery for the reduction of the bran and such gluten as adheres thereto, which improvements are made the subject of another patent, though here shown for the better elucidation of my present invention.

My improvement in method consists in first partially reducing the whole grain, then separating the bran from the inner portions, detached or made detachable without injury in such partial reduction, then reducing the bran and inner portions separately from each other, and finally mixing the separately-reduced parts to form the finished product. This product is not claimed in this patent, because I propose to make it the subject-matter of claim in another patent.

In order to secure in the product all the nutritive and desirable elements of the wheat and to exclude therefrom the merely woody and innutritious portions thereof, which latter constitute the outer folds of the integument, I prefer to first remove such outer folds, which may be done by any approved method of decortication. This step, however, is not material to my invention. The grain, suitably prepared, is crushed, broken, or in any approved manner reduced until, as far as possible, the granular portions of the grain are separable from the bran. This condition of the grain may preferably be reached by a series of steps in reduction, each followed by bolting or separation, to preserve the inner substance from injury. From this point the reduction is pursued upon the bran (with any gluten adhering thereto) and upon the main portion of the inner grain substance separately. For the reduction of the latter I prefer to use the best means known to the art for flouring middlings, in order that all injury to the product may be avoided. After the bran has been by itself reduced to a condition of substantially equal fineness with the white flour the flour of the bran is mixed with the inner grain substance by any approved means, thus combining the original nutritive elements of the wheat in substantially their original proportions and presenting them for use in a substantially uniform state of comminution. In this method of separate reduction the inner grain substance remains wholly uninjured from any specially severe action to which it would be subjected in reducing the whole together until the same could be floured. The several food elements are intimately mixed and combined. The parts are capable of being uniformly acted upon by moisture and heat in panification. The chemical food elements are perfectly conserved, and, by reason of the uniform texture of the bread, are all equally and readily available for digestion, assimilation, and consequent nutrition.

In appearance the bread, like the flour, is of uniform texture and color, agreeable alike to the eye and to the taste, and has a spongy lightness equal to that of bread made from the best white flour, and hitherto unknown in any product of whole wheat or so-called "Graham" or "unbolted" flour.

In the development of this invention I have discovered that appliances for reducing the inner grain substance of wheat are not well adapted to the reduction of the bran to the extent contemplated and required in the product described. I have, therefore, devised a machine specially for the purpose of reducing the bran, which will be understood from the following description, in which reference is made to the accompanying drawings.

Said machine consists essentially of a circular shell having its inner periphery covered by a sharply rough surface—preferably a series of file-cut serrations—and a winged disk mounted to rotate rapidly within said shell, whereby the bran fed near the center of the shell is rapidly swept about and against the sharp serrations mentioned, which cut the bran into particles. A marginal opening upon each side of the shell allows the bran-flour to escape by being blown out when sufficiently reduced by the action of the wings of the disk.

In the drawings, Figure 1 is a central section of the machine, taken at right angles to the disk-axis. Fig. 2 is a central vertical section through the disk-axis. Fig. 3 is a side elevation of the machine and a vertical section of the housing, into which the machine discharges; and Figs. 4, 5, and 6 are details.

A is the circular peripheral part of the shell, about eight inches wide and about five feet interior diameter. $A^2$ are side plates, secured to the edges of the part A by bolts $a$.

C C are a number of narrow steel plates, which form the inner peripheral surface of the shell.

D is a smooth steel disk, mounted accurately and securely on the shaft E, provided with the pulley P. The disk D is about one and one-half inch less in diameter than the interior of the shell after the plates C are in place, and is provided at its margin with a series of wings, I I, one of which is shown detached in Fig. 5, about one-eighth inch in thickness, and extending laterally close to the side plates of the shell. The exposed faces of the steel plates C C are sharply serrated, like a single-cut file, the serrations in alternate plates running preferably in opposite oblique directions, as seen in Fig. 2.

R R are feed-pipes delivering the bran near the center of the machine, and J J are discharge-openings in the side plates, $A^2$, near the periphery of the shell, provided with slides L.

In the operation of the machine the disk D is rotated at a high speed, and the bran (with such gluten as remains thereon) is thrown violently against and is swept along over the sharp cut faces of the plates C, and is thereby reduced to fine particles or granular flour. In this condition it escapes at J J into the chamber M, where it is collected, and whence it is removed by the conveyer N. A dust-cloth, O, allows the air to pass, but retains the bran-flour.

In a mill for carrying out my invention the reduction of all parts of the grain should preferably be carried forward simultaneously, and the capacities of the several reducing-machines should be adjusted and their connections should be arranged to bring together in the product the same elements, and consequently in the same proportion, as they existed in the original grain.

I have as a substitute for the steel file-cut plates C C used blocks of burr-stone with fair results; but the cut steel plates are preferable.

I claim as my invention—

The method of making whole-wheat flour which consists in first separating the inner grain substance from the bran; second, reducing the inner grain substance and the bran separately to flour, and thereafter mixing the two flour-products, substantially as described.

In testimony that I claim the foregoing as my invention I affix my signature in presence of two witnesses.

WALLACE WARREN.

Witnesses:
 M. E. DAYTON,
 JESSE COX, Jr.